(12) United States Patent  (10) Patent No.: US 9,260,353 B1
Pierce et al.  (45) Date of Patent: Feb. 16, 2016

(54) ORGANIC FEED METHOD

(71) Applicant: Pioneer Peat, Inc., Grand Forks, ND (US)

(72) Inventors: Michael Pierce, Grand Forks, ND (US); Kevin Pierce, Grand Forks, ND (US); Austin M. Pierce, Grand Forks, ND (US)

(73) Assignee: Pioneer Peat, Inc., Grand Forks, ND (US)

( * ) Notice: Subject to any disclaimer, the term of this patent is extended or adjusted under 35 U.S.C. 154(b) by 0 days.

(21) Appl. No.: 14/470,524

(22) Filed: Aug. 27, 2014

(51) Int. Cl.
*C05F 11/02* (2006.01)

(52) U.S. Cl.
CPC ................................. *C05F 11/02* (2013.01)

(58) Field of Classification Search
None
See application file for complete search history.

(56) References Cited

U.S. PATENT DOCUMENTS

| | | | | |
|---|---|---|---|---|
| 3,844,759 A * | 10/1974 | Ruel et al. | | 71/24 |
| 4,006,004 A * | 2/1977 | Seferian et al. | | 71/11 |
| 5,009,697 A * | 4/1991 | Martin et al. | | 71/24 |
| 6,245,121 B1 * | 6/2001 | Lamy et al. | | 71/1 |
| 6,458,747 B1 * | 10/2002 | Kulik | | 504/140 |
| 7,896,944 B2 * | 3/2011 | Karr | | 71/9 |
| 2013/0186155 A1 * | 7/2013 | Blaine | | 71/21 |
| 2014/0366596 A1 * | 12/2014 | Young et al. | | 71/8 |

* cited by examiner

*Primary Examiner* — Wayne Langel
(74) *Attorney, Agent, or Firm* — Neustel Law Offices

(57) ABSTRACT

An organic feed method for use as food supplements for humans or animals as well as for feeding plants. The organic feed method generally includes first mixing an organic material such as peat moss or compost with water at a ratio of approximately 1.2 pounds of organic material to 1 gallon of water. The resulting mixture is pumped through a wet mill grinder to reduce size, maintaining a temperature of below 130 degrees Fahrenheit through the mixture and grinding processes. After grinding, the resulting mush is pumped through a 400 mesh filter, cooled to room temperature, and bottled as an organic feed. The organic feed may be utilized as a health or nutritional food supplement for humans or animals. The organic feed may also be mixed with water or chemicals such as fertilizer and applied to plants as plant feed.

13 Claims, 3 Drawing Sheets

ORGANIC FEED METHOD

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to an organic feed method and more specifically it relates to an organic feed method for use as food supplements for humans or animals as well as for feeding plants.

2. Description of the Related Art

Any discussion of the related art throughout the specification should in no way be considered as an admission that such related art is widely known or forms part of common general knowledge in the field.

Different types of organic feeds have been in use for years to aid in plant development as well as nutrition supplementation for humans and animals. While these methods have had their uses, there has still been room for improvement in terms of efficiency for organic feeds, particularly with regard to how they are manufactured.

Because of the inherent problems with the related art, there is a need for a new and improved organic feed method for use as food supplements for humans or animals as well as for feeding plants.

BRIEF SUMMARY OF THE INVENTION

The invention generally relates to an organic feed method which includes first mixing an organic material such as peat moss or compost with water at a ratio of approximately 1.2 pounds of organic material to 1 gallon of water. The resulting mixture is pumped through a wet mill grinder to reduce size, maintaining a temperature of below 130 degrees Fahrenheit through the mixture and grinding processes. After grinding, the resulting mush is pumped through a 400 mesh filter, cooled to room temperature, and bottled as an organic feed. The organic feed may be utilized as a health or nutritional food supplement for humans or animals. The organic feed may also be mixed with water or chemicals such as fertilizer and applied to plants as plant feed.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview.

Figure 1:
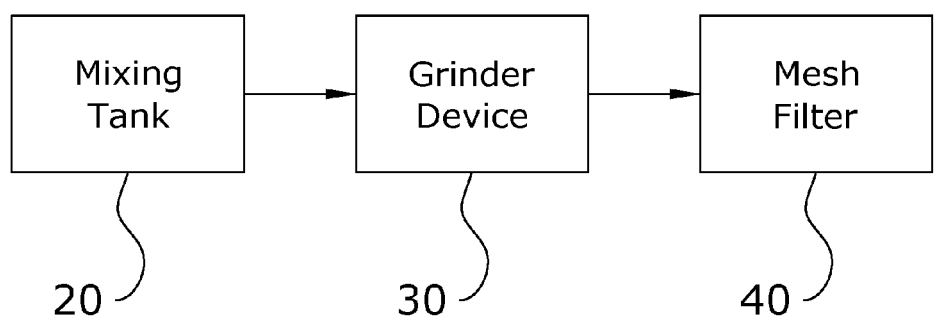
FIG. 1 is a block diagram of the present invention.
Figure 2:
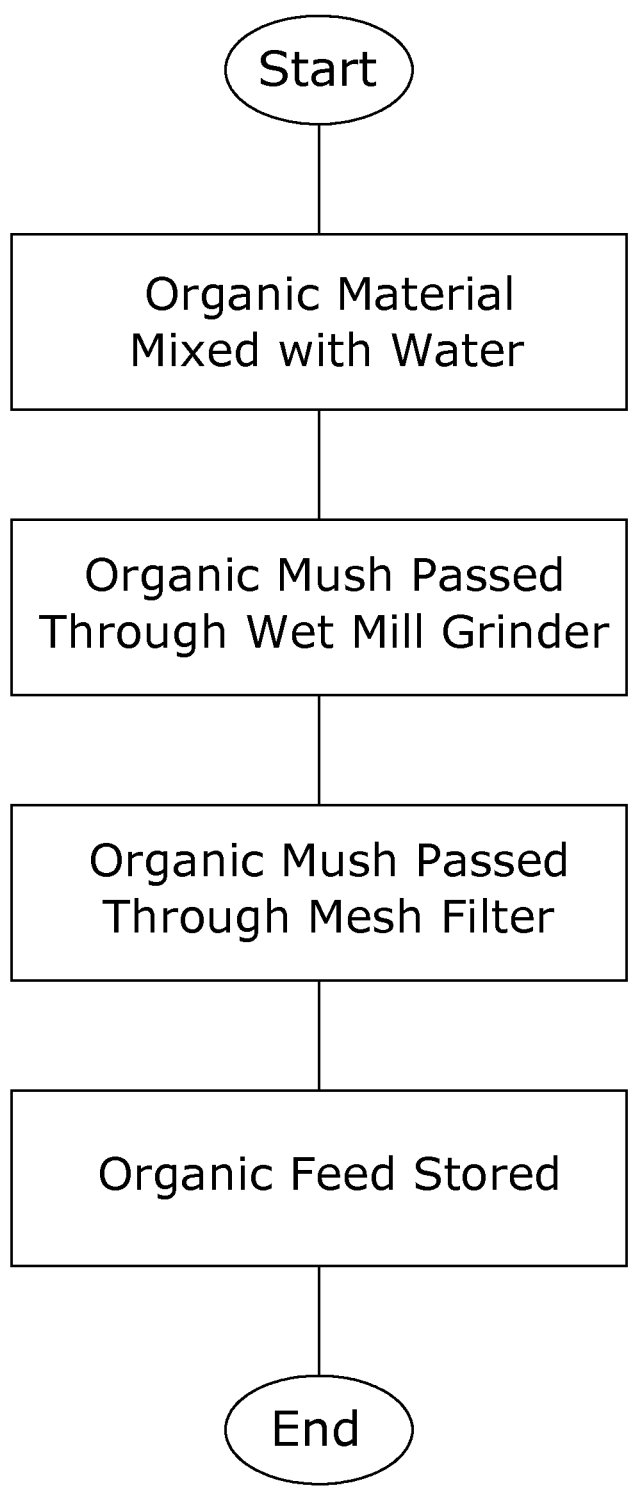
FIG. 2 is a flow chart illustrating manufacture methods of the present invention.
Figure 3:
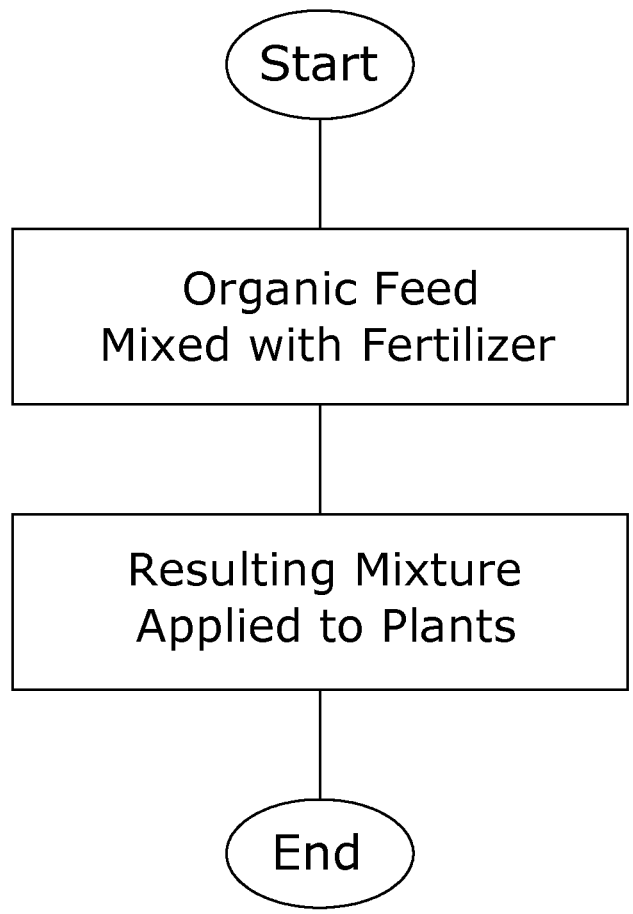
FIG. 3 is a flow chart illustrating usage methods for plant feed with the present invention.

Turning now descriptively to the drawings, in which similar reference characters denote similar elements throughout the several views, FIGS. 1 through 3 illustrate an organic feed method, which comprises first mixing an organic material such as peat moss or compost with water at a ratio of approximately 1.2 pounds of organic material to 1 gallon of water. The resulting mixture is pumped through a wet mill grinder to reduce size, maintaining a temperature of below 130 degrees Fahrenheit through the mixture and grinding processes. After grinding, the resulting mush is pumped through a 400 mesh filter, cooled to room temperature, and bottled as an organic feed. The organic feed may be utilized as a health or nutritional food supplement for humans or animals. The organic feed may also be mixed with water or chemicals such as fertilizer and applied to plants as plant feed.

B. Method of Manufacture.

The methodology used to manufacture the present invention may vary in different ways without affecting the overall efficiency of the resulting organic feed. First, an organic material or mixture of organic materials is selected as a basis for the organic feed. It should be appreciated that a wide range of organic materials may be utilized in preparation of the organic feed. Mixtures of organic and inorganic materials may also be utilized in some embodiments.

In a preferred embodiment, the organic material utilized as a basis for the organic feed will be comprised of peat moss. However, various other materials may be utilized, such as composts. In some cases, inorganic materials such as plastic chips or the like may be utilized in combination with the base organic material (such as peat moss). Any type of organic material may be utilized, though some will provide more benefits than others.

The organic material is first mixed with water, such as within a tank. The ratio of organic material to water will preferably range between 1-1.5 pounds of organic material to 1 gallon of water. In a preferred embodiment 1.2 pounds of organic material will be mixed with every 1 gallon of water. The organic material and water may be mixed via various methods, such as with a tank mixer, separate devices, or by hand.

The organic material and water will be mixed for a set period of time. The period of time may vary between 15 minutes to 1 hour. In a preferred embodiment, the organic material and the water will be mixed for approximately half-an-hour. More or less time may be utilized for different mixes and different application.

After mixing the organic material and water for the set period of time, the resulting organic mush will be pumped through a grinder device for size reduction. Larger pieces of organic material within the mush will need to be reduced for usage in the organic feed. Different types of grinders may be utilized, though a wet mill grinder will be utilized in a preferred embodiment. The amount of time and type of grinder used may vary depending on the needs of the resulting organic feed and its applications.

Throughout the mixing and grinding process, the organic material, water, and mush may be kept at a temperature below 130 degrees Fahrenheit in some embodiments. In most cases, separate cooling will not be needed to allow such a temperate to be maintained. If necessary, a cooling unit may be provided to ensure the temperature remains below the 130 degree threshold. Temperatures over 130 degrees may result in the loss of biological materials within the organic materials or mush.

In other embodiments, it may be desirable to heat the organic material, water, and mush to a temperate above 130 degrees Fahrenheit. In such embodiments, biologicals will be killed prior to bottling. It has been shown that, in cases where bottles are stored for long periods of time, any surviving biologicals will be so active that they will continue to populate the bottle; sometimes until the bottle ruptures or explodes. In such cases, the material, water, and mush are cleared of biologicals prior to bottling. The biologicals may be re-introduced just prior to use.

The resulting organic mush is passed through a mesh filter to further reduce the mush into the organic feed. It is preferable that the organic feed be of a viscosity and density to allow it to be sprayed for certain applications. Thus, a 400-size mesh filter will preferably be utilized. However, depending on the end application of the organic feed, different-sized mesh filters may be utilized.

After the mush has been passed through the mesh filter, the organic feed will be ready for use. It may be stored in containers to be manually applied to various items, or may be used in a spray bottle for more even distribution. The organic feed may be utilized for a wide range of purposes as described below.

C. Method of Usage.

The organic feed may be utilized for a wide range of purposes, including as feed for plants, animals, and humans. For plant usage, the organic feed will generally be mixed with chemicals such as fertilizers and then applied to the plant, such as by spraying. In some cases, the organic feed will be mixed with water prior to being applied to a plant. However, the efficiency of the organic feed will be greatly boosted by mixture with chemicals such as fertilizers.

The organic feed may also be utilized for humans or animals. The organic feed may be directly consumed or mixed with other fluids or foods prior to being fed to a human or animal. Water is particularly suitable for mixing with the organic feed to make it more palatable to the consumer.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A method of manufacturing an organic feed, comprising:
providing a first amount of a first material, wherein said first material comprises peat moss; then,
creating a mixture by mixing said first material with a second amount of a fluid for a period of time at a first temperature, wherein said period of time is between 15 and 45 minutes, wherein said first temperature is less than 130 degrees Fahrenheit, wherein a ratio of said first amount to said second amount is 1/1.2; then,
grinding said mixture to create a grinded mixture; and
filtering said grinded mixture through a mesh filter.

2. The method of manufacturing an organic feed of claim 1, wherein said fluid is comprised of water.

3. The method of manufacturing an organic feed of claim 1, wherein said period of time is 30 minutes.

4. The method of manufacturing an organic feed of claim 1, wherein said mesh filter is comprised of a 400 size mesh filter.

5. The method of manufacturing an organic feed of claim 1, wherein said grinding step is performed by a wet mill grinder.

6. A method of manufacturing an organic feed, comprising:
providing an organic material, wherein said organic material is comprised of peat moss;
mixing said organic material with water for a period of time at a temperature; then,
pumping said mixture through a grinder to create a grinded mixture; then,
pumping said grinded mixture through a mesh filter.

7. The method of manufacturing an organic feed of claim 6, wherein said organic material is mixed with said water at a ratio of 1.2 pounds of organic material to 1 gallon of water.

8. The method of manufacturing an organic feed of claim 7, wherein said temperature is less than 130 degrees Fahrenheit.

9. The method of manufacturing an organic feed of claim 8, wherein said period of time is between 15 and 45 minutes.

10. The method of manufacturing an organic feed of claim 9, wherein said period of time is 30 minutes.

11. The method of manufacturing an organic feed of claim 10, wherein said mesh filter is comprised of a 400 size mesh filter.

12. The method of manufacturing an organic feed of claim 11, wherein said grinding step is performed by a wet mill grinder.

13. A method of feeding a plant, comprising:
providing an organic material comprised of peat moss;
creating a mixture by mixing said organic material with water for 30 minutes at less than 130 degrees Fahrenheit; then,
pumping said mixture through a wet mill grinder to create a grinded mixture; then,
pumping said grinded mixture through a 400 size mesh filter to create a filtered mixture; then,
bottling said filtered mixture;
mixing said filtered mixture with a fertilizer to create a fertilized mixture; and
spraying said fertilized mixture on a plant.

* * * * *